(12) United States Patent
Maier et al.

(10) Patent No.: US 7,868,756 B2
(45) Date of Patent: Jan. 11, 2011

(54) ZONE BOUNDARY ADJUSTMENT METHOD AND SYSTEM

(75) Inventors: Holger H. Maier, Weil im Schoenbuch (DE); Amadeus Podvratnik, Filderstadt (DE); Torsten E. Teich, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 296 days.

(21) Appl. No.: 12/207,544

(22) Filed: Sep. 10, 2008

(65) Prior Publication Data

US 2010/0060474 A1 Mar. 11, 2010

(51) Int. Cl.
G08B 1/08 (2006.01)
G08B 25/00 (2006.01)
G08G 1/123 (2006.01)

(52) U.S. Cl. .............................. 340/539.26; 340/539.2; 340/539.22; 340/539.13; 340/825.36; 340/825.49; 340/995.14; 340/995.15; 340/525; 701/208

(58) Field of Classification Search ............. 340/539.26
See application file for complete search history.

(56) References Cited

U.S. PATENT DOCUMENTS

| | | | |
|---|---|---|---|
| 6,100,806 A | * | 8/2000 | Gaukel .................... 340/573.4 |
| 6,434,258 B2 | * | 8/2002 | Wiens ........................ 382/113 |
| 6,917,290 B2 | * | 7/2005 | Land ....................... 340/539.1 |
| 7,009,510 B1 | * | 3/2006 | Douglass et al. ............ 340/531 |
| 7,299,057 B2 | * | 11/2007 | Anderson ................ 455/456.1 |
| 7,417,562 B2 | * | 8/2008 | Sera ....................... 340/995.13 |
| 2005/0168353 A1 | * | 8/2005 | Dement et al. ........... 340/995.1 |
| 2006/0217881 A1 | * | 9/2006 | Pei et al. ..................... 701/208 |

* cited by examiner

Primary Examiner—Donnie L Crosland
(74) Attorney, Agent, or Firm—Schmeiser, Olsen & Watts; Joseph E. Bracken

(57) ABSTRACT

A zone shaping method and system. The method comprises receiving by a computing system from a sensory infrastructure transmitter attached to an object data associated with the first object. The object is located within a zone area. The computing system calculates a location within the zone area for the object. The computing system receives first environmental data associated with a first environmental condition in the zone area from a first sensor. The computing system analyzes the data, the location, and the first environmental data. The computing system generates based on results of the analysis, a first modified zone area associated with the zone area.

20 Claims, 16 Drawing Sheets

ZONE BOUNDARY ADJUSTMENT METHOD AND SYSTEM

FIELD OF THE INVENTION

The present invention relates to a method and associated system for adjusting zone area boundaries due to environmental conditions.

BACKGROUND OF THE INVENTION

Locating safe regions for various items typically comprises an inefficient process with little flexibility. Accordingly, there exists a need in the art to overcome at least some of the deficiencies and limitations described herein above.

SUMMARY OF THE INVENTION

The present invention provides a method comprising:

receiving, by a computing system from a first sensory infrastructure transmitter attached to a first object, first data associated with said first object, wherein said first object is located within a first zone area, wherein said first data comprises location information associated with said first object and first attributes data describing characteristics associated with said first object, and wherein said first zone area comprises a first size;

calculating, by said computing system based on said first data, a first location within said first zone area for said first object;

storing, by said computing system, a first identifier for said first location;

receiving, by said computing system from a first sensor, first environmental data associated with a first environmental condition in said first zone area, wherein said first sensor is located in said first zone area;

storing, by said computing system, said first environmental data;

first analyzing, by said computing system, said first data, said first identifier, and said first environmental data; and generating, by said computing system based on results of said first analyzing, a first modified zone area associated with said first zone area, wherein said first modified zone area comprises a second size, and wherein said second size differs from said first size.

The present invention provides a computing system comprising a processor coupled to a computer-readable memory unit, said memory unit comprising instructions that when executed by the processor implements a zone shaping method, said method comprising:

receiving, by said computing system from a first sensory infrastructure transmitter attached to a first object, first data associated with said first object, wherein said first object is located within a first zone area, wherein said first data comprises location information associated with said first object and first attributes data describing characteristics associated with said first object, and wherein said first zone area comprises a first size;

calculating, by said computing system based on said first data, a first location within said first zone area for said first object;

storing, by said computing system, a first identifier for said first location;

receiving, by said computing system from a first sensor, first environmental data associated with a first environmental condition in said first zone area, wherein said first sensor is located in said first zone area;

storing, by said computing system, said first environmental data;

first analyzing, by said computing system, said first data, said first identifier, and said first environmental data; and generating, by said computing system based on results of said first analyzing, a first modified zone area associated with said first zone area, wherein said first modified zone area comprises a second size, and wherein said second size differs from said first size.

The present invention advantageously provides a simple method and associated system capable of locating safe regions for various items.

DETAILED DESCRIPTION OF THE INVENTION

Figure 1:
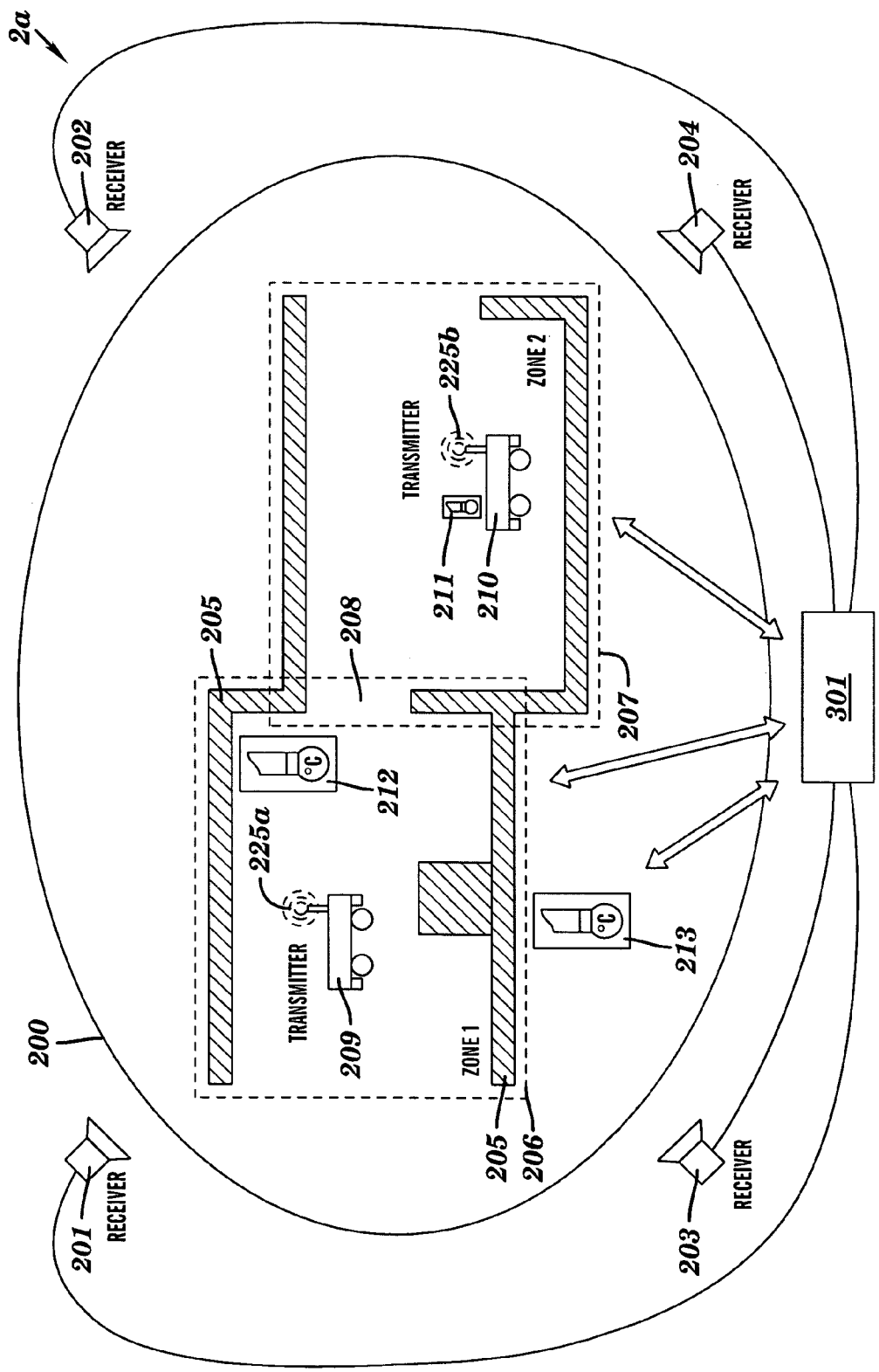
FIG. 1 illustrates a block diagram of a system for adjusting zone boundaries, in accordance with embodiments of the present invention.

FIG. 1 illustrates a block diagram of a system 2a for adjusting zone boundaries 206 and 207, in accordance with embodiments of the present invention. Zone boundary 206 comprises a perimeter formed around a zone 1. Zone boundary 207 comprises a perimeter formed around a zone 2. A zone (e.g., zone 1, zone 2, etc) is defined herein as an area in which a position, velocity, and direction of an object(s) may be determined. An object may comprise, a vehicle, a person, etc. System 2a is used to dynamically adjust zone boundaries (e.g., zone boundary 206, zone boundary 207, etc) such that zones (e.g., zone 1, zone 2, etc) are dynamically expanded and/or deflated (e.g., a balloon zone) or combined with one or more additional zones in order to form a quicksilver zone (i.e., a combination zone). The zone may be dynamically expanded and/or deflated or combined with one or more additional zones based on:
1. Dynamic attributes (e.g., environmental conditions) in the zone.
2. Characteristics of objects approaching, leaving, or residing in the zone.
3. Analysis performed by a rule based engine or programmed logic.

Quicksilver zones and balloon zones may be used to identify areas of danger as a result of the joint occurrence or juxtaposition of zones and objects which would otherwise be safe by themselves.

System 2a of FIG. 1 comprises a sensory infrastructure controlled area 200 and sensory infrastructure receivers 201, 202, 203, and 204 connected to an evaluator computing system 301. A sensory infrastructure may comprise any type of transmitter/receiver system capable of transmitting and receiving electrical signals including, inter alia:
1. A radio frequency identification (RFID) system.
2. An audio and ultrasound location system.
3. A wireless network (WiFi) based system.
4. A DECT based system.
5. A radar based system.
6. Any type of real time location system.

Sensory infrastructure controlled area 200 comprises zone 1, zone 2, and a sensor 213. Sensor 213 is connected to an evaluator computing system 301. Sensor 213 monitors environmental conditions (e.g., temperature, pressure, gasses, etc) outside of zone 1 and zone 2. Zone 1 comprises an object 209 (e.g., a vehicle) and a sensor 212. Sensor 212 is connected to evaluator computing system 301. Sensor 212 monitors environmental conditions (e.g., temperature, pressure, gasses, etc) inside zone 1. Object 209 comprises a sensory infrastructure transmitter 225a (e.g., an RFID transmitter). Zone 2 comprises an object 210 (e.g., a vehicle). Object 210 comprises a sensory infrastructure transmitter 225b (e.g., an RFID transmitter) and a sensor 211. Sensor 211 is connected to an evaluator computing system 301. Sensor 211 monitors environmental conditions (e.g., temperature, pressure, gasses, etc) in zone 2 and near object 210. Sensory infrastructure receivers 201, 202, 203, and 204 (e.g., an RFID receiver) receive signals (e.g., location data, object characteristic data, etc) from sensory infrastructure transmitters 225a and 225b and transmit the signals to evaluator computing system 301. Evaluator computing system 301 receives signals (e.g., comprising environmental conditions) from sensors 211, 212, and 213. Zones 1 and 2 surround walls of a building 205. Location, dimension, and shape of zones 1 and 2 are generated by evaluator computing system 301 (i.e., in response to receiving signals from sensory infrastructure receivers 201, 202, 203, and 204 and sensors 211, 212, and 213) thereby generating a logical representation of a real-world (physical) area in evaluator computing system 301.

System 2a is used to determine and control a position, velocity, and direction of movable and non-movable objects (e.g., objects 209 and 210) in specific areas (e.g., zone or zone 2). A movable or non-movable object may comprise a vehicle, a person, or any other asset. Evaluator computing system 301 is used to identify objects in a zone and acquire a position, velocity, and direction for the object. In order to identify an object, the object is equipped with a transmitter (e.g., sensory infrastructure transmitters 225a and 225b) that transmits information associated with the object (e.g. an object unique identifier) in a data packet (e.g., a datagram). Each zone is equipped with receivers (e.g., sensory infrastructure receivers 201, 202, 203, and 204) for receiving the information. The position of an object may be determined by evaluating a runtime of the signal by receiving the signal with synchronized receivers (sensory infrastructure systems). The position may also be determined by light sensors, microwave, sonic or ultrasonic sensors or a GPS (global positioning system) receiver incorporated in a target that receives the signal and sends position information to evaluator computing system 301. Evaluator computing system 301 comprises a computer program that is able to correlate positioning information from objects with position information of receivers so that their absolute and relative positions may be determined.

An object may transmit (i.e., to evaluator computing system 301) attributes specifying characteristics associated with the object. The characteristics may comprise characteristics specifying that the object, inter alia:
1. Is human.
2. Carries explosives, flammable substances, or radioactive/noxious substances.
3. Must not approach (welding, paint shop, etc) construction areas.
4. Must maintain a safe distance from people.

Additionally, zone attributes are assigned to each zone. The zone attributes may specify specific characteristics of a zone such as, inter alia:
1. Welding construction work is in progress in the zone
2. The zone is dangerous.
3. The zone stores flammable/explosive substances (e.g., hydrogen gas, etc).
4. A radioactive emission in emitted in the zone.
5. X-ray emission is taking place (e.g. if an x-ray tube is currently operating) in the zone.
6. A temperature in the zone.

Sensors 211, 212, and 213 monitor and capture environmental conditions. Sensors 211, 212, and 213 may comprise, inter alia, the following types of sensors:
1. Temperature sensors (e.g., thermometer, thermocouple, RTD, etc).
2. Radiation sensors.
3. Fluid or gas sensors.
4. Shock detectors.
5. Acoustic level sensors.
6. Smoke detectors.
7. Pressure sensors.
8. Light sensors.
9. A motion detector.
10. Electromagnetic field sensors.

Zone characteristics and object characteristics may be coded by classifying them into classes of certain characteristics. For example:
Class A: Inflammables and explosives.
Class B: Radioactive and x-ray.
Class C: Shock sensitive.

Zone characteristics and object characteristics are correlated by evaluator computing system 301 in order to identify areas of danger. Evaluator computing system 301 may comprise a rule engine for performing the correlation. The rule engine maintains:
1. A list of zones.

2. Relations of zone characteristics and object characteristics.
3. Relations of characteristics of two (or more) different objects.
4. A specification describing an action to take if the condition which is defined by the aforementioned relations is fulfilled (i.e., correlation-action specification).

Zone characteristics and object characteristics may be fixed or dynamic. Zones may be re-shaped or combined with other zones dependent on analysis performed by the rule engine. This results in the introduction of the concept of zone shaping by means of balloon zones and/or quicksilver zones. Balloon zones comprise zones with a variable size (increased or decreased size). A balloon zone is deflated in order to cover a broader area of increased security needs (e.g., in case a dangerous situation occurs). Additionally, the same balloon zone may be inflated after evaluator computing system 301 concludes that the danger has been prevented. Formation of quicksilver zones takes place when the combination of a zone characteristic and a characteristic of an object approaching the zone or the combination of characteristics of two consecutive zones lead to a condition of increased danger. A quicksilver zone is shaped such that it covers both zone areas (i.e., a combination of zones). Alternatively, dedicated zones may be separated from a quicksilver zone (e.g., if the condition which has lead to formation of the quicksilver zone is not fulfilled anymore).

The following examples illustrate the use of a rule engine for zone shaping (i.e., to generate or modify a balloon zone or a quicksilver zone):

Example 1

IF ZONE OF TYPE "radioactive emission in zone"
  DO deflate zone (=form a balloon zone)

Example 2

IF ZONE1 OF TYPE "storage of inflammable chemicals or industry gases"
  AND ZONE2 OF TYPE "storage of oxygen"
  AND ZONE 1 and ZONE2 consecutive
  DO combine both zones (=form a quicksilver zone)

If an area of danger is identified, evaluator computing system 301 may take appropriate action to prevent persons from being exposed to that area or to avert the danger. Zone characteristics are stored either in the evaluator computing system 301 or in the receiver devices. If characteristics are held in the receivers and the rule engine operates on the same receivers or is at least accessible by the receivers then the alert system may operate self-sufficient and engage alarms and corrective actions without interaction with the evaluator as illustrated by the following examples:

Example 3

IF temperature sensor near ZONE1 signals>n☐C
  DO Inflate ZONE1 (=balloon zone)

Example 4

IF ZONE1 OF TYPE "high temperature"
  AND ZONE2 OF TYPE "inflammable"
  AND ZONE1 and ZONE2 are converging
  DO form a quicksilver zone of ZONE1 and ZONE2

Example 5

IF OBJECT OF TYPE "is human"
  APPROACHING ZONE1 and ZONE1 detects "radioactive emission in zone"
  DO Send warning to OBJECT "Danger! Approaching radioactive zone"

Example 6

IF OBJECT OF TYPE "carries inflammables"
  APPROACHING ZONE OF TYPE "welding construction work in progress in this zone"
  DO Send warning to OBJECT "Danger! Construction area prohibited for inflammables"

Example 7

IF OBJECT1 OF TYPE "safe distance (to persons) must be greater than x feet"
  APPROACHING OBJECT2 OF TYPE "is human"
  DO Send warning to OBJECT2 "Danger! Keep away from OBJECT!"
  AND Send warning to OBJECT1 "Danger! Keep away from OBJECT2"

The following example illustrates the concept of zone and object classes being used:

Example 8

IF OBJECT OF CLASS A
  APPROACHING ZONE OF CLASS B
  DO Send warning to OBJECT "Danger!"

Balloon zones and quicksilver zones may be formed as a result of a treatment of environmental conditions. Alternatively, business processes or program logic may exist which perform reshaping of zones or formation/termination of quicksilver zones dependent on safety and security policies. For example, a security policy may specify that in a museum after closing time, all distance zones defined around exhibits are combined thereby forming one quicksilver zone formed around the whole exhibition space. Additionally, zones may be fixed in position or may be defined around moving objects (e.g., sensory infrastructure transmitters) as illustrated in FIGS. 12-15.

Figure 2:
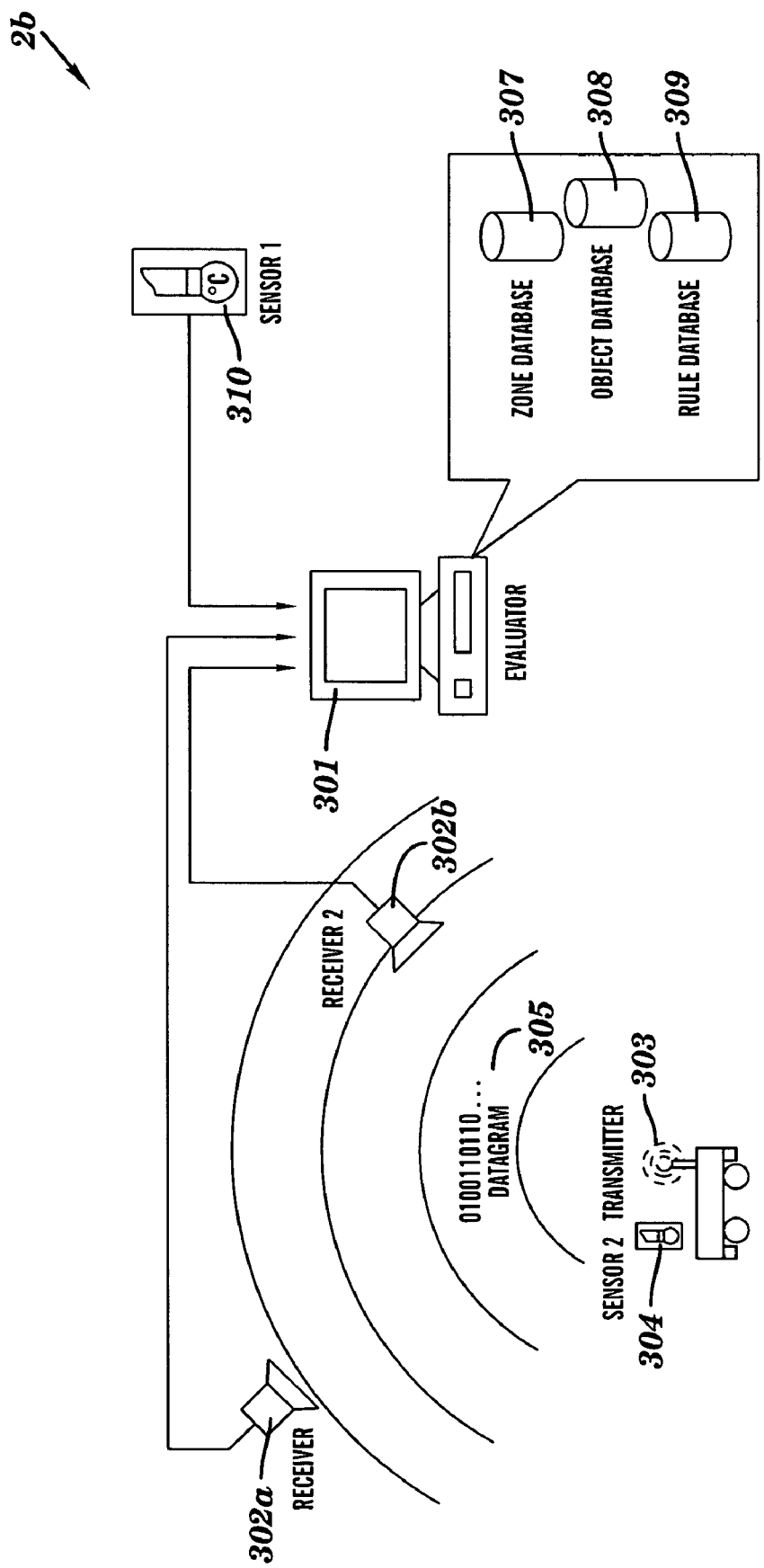
FIG. 2 illustrates a block diagram of a system illustrating elements involved in the data processing of system of FIG. 1, in accordance with embodiments of the present invention.

FIG. 2 illustrates a block diagram of a system 2b illustrating elements involved in the data processing of system 2a of FIG. 1 for adjusting zone boundaries 206 and 207, in accordance with embodiments of the present invention. Sensory infrastructure receiver 302a and sensory infrastructure receiver 302b are used to:
1. Monitor a sensory infrastructure controlled area.
2. Receive sensory infrastructure datagrams from sensory infrastructure transmitters 303.
3. Transmit the datagrams to evaluator computing system 301.

Sensory infrastructure datagrams comprise location information, information about the object which carries the sensory infrastructure Transmitter, and other characteristics such as, inter alia: environmental conditions captured by sensor 304. Evaluator computing system 301 receives data from sensors which are installed inside or outside the sensory infrastructure controlled area (e.g., sensor 310). Data captured by the sensors are specified as zone environmental conditions. Evaluator computing system 301 stores the zone environmental conditions in zone database 307 (i.e., internal or external to evaluator computing system 301). Likewise, location data and environmental conditions received from sensory infrastructure Transmitters are stored in object database 308 (i.e., internal or external to evaluator computing system 301). Rule database 309 (i.e., internal or external to evaluator computing system 301) stores the rules describing how to correlate zones, objects, and associated environmental conditions in order to deduce or recognize situations of danger and other conditions.

Figure 3:
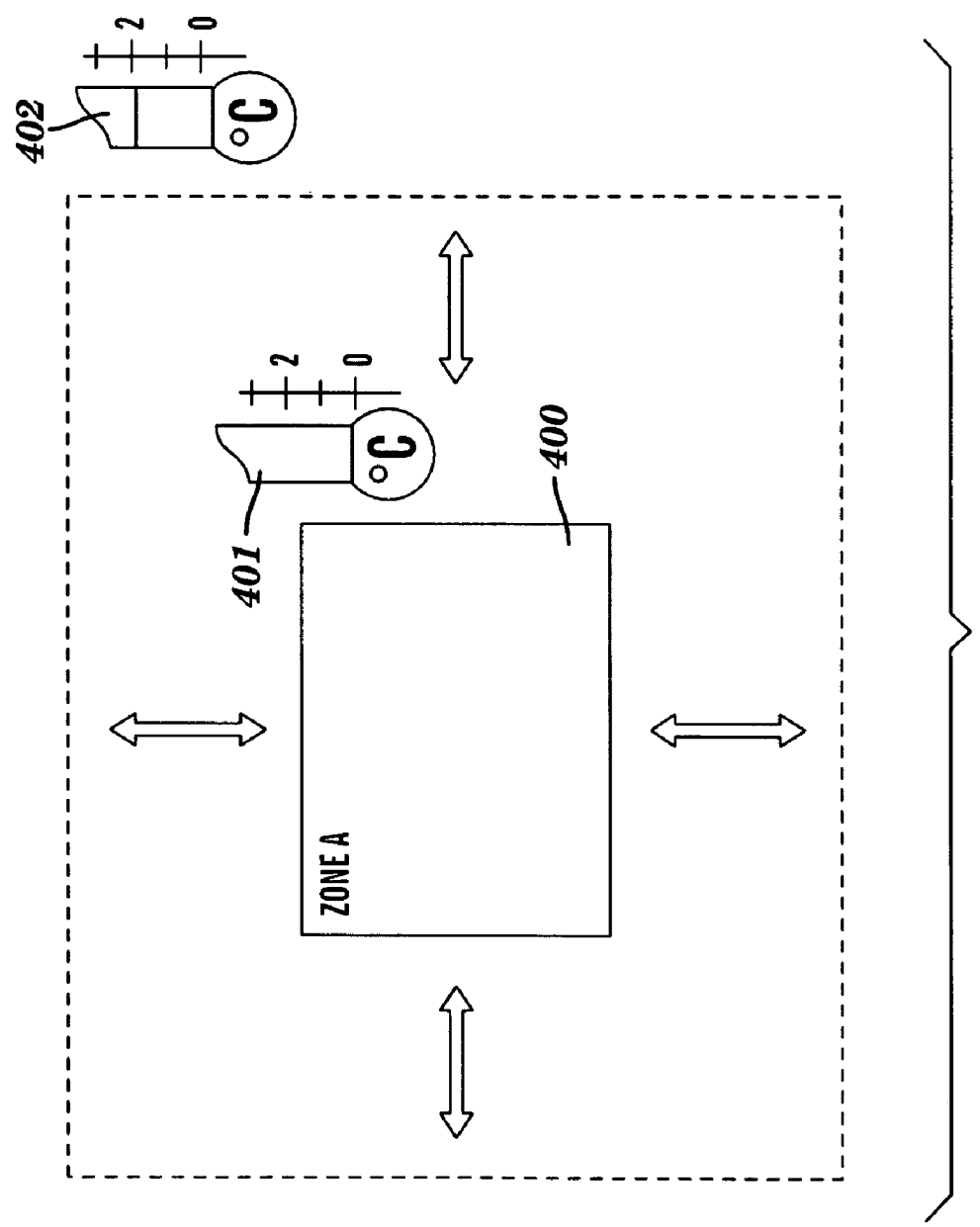
FIG. 3 illustrates a zone shaping process performed by the system of FIG. 1, in accordance with embodiments of the present invention.

FIG. 3 illustrates a zone shaping process performed by system 2a of FIG. 1, in accordance with embodiments of the present invention. Depending on environmental conditions (e.g., a temperature), a zone 400 is inflated if a threshold value of sensor 401 is exceeded thereby forming a balloon zone. At least one additional sensor 402 is installed in zone 400. Sensor 402 captures a temperature of a distant area around original zone 400. Dependent on a safety policy (e.g., defined in rule database 309 of FIG. 2), zone 400 is inflated further if a temperature threshold of sensor 402 is exceeded.

Figure 4:
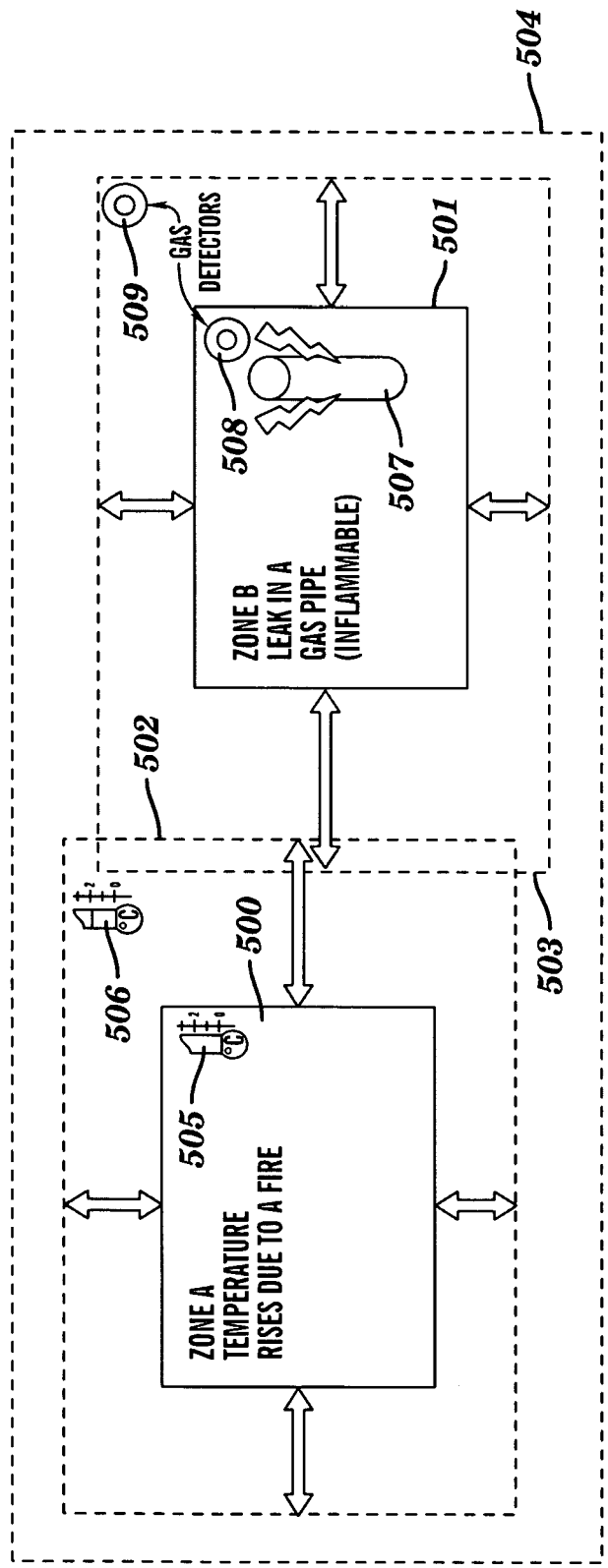
FIG. 4 illustrates a complex zone shaping process performed by the system of FIG. 1, in accordance with embodiments of the present invention.

FIG. 4 illustrates a complex zone shaping process performed by system 2a of FIG. 1, in accordance with embodiments of the present invention. FIG. 4 depicts a complex scenario in which two adjacent zones (i.e., a zone 500 and a zone 501) are inflated to balloon zones 502 and 503 due to different conditions of danger. In this scenario, temperature sensors 505 and 506 recognize an increased temperature in zone 500 and gas detectors 508 and 509 report a leak in a gas pipeline 507. An increase of the temperature in zone 500 would not be dangerous by itself, but when the increased temperature is combined with the gas leak a potentially dangerous situation occurs in zones 500 and 501. Therefore a quicksilver zone 504 is formed around the whole area.

Figure 5:
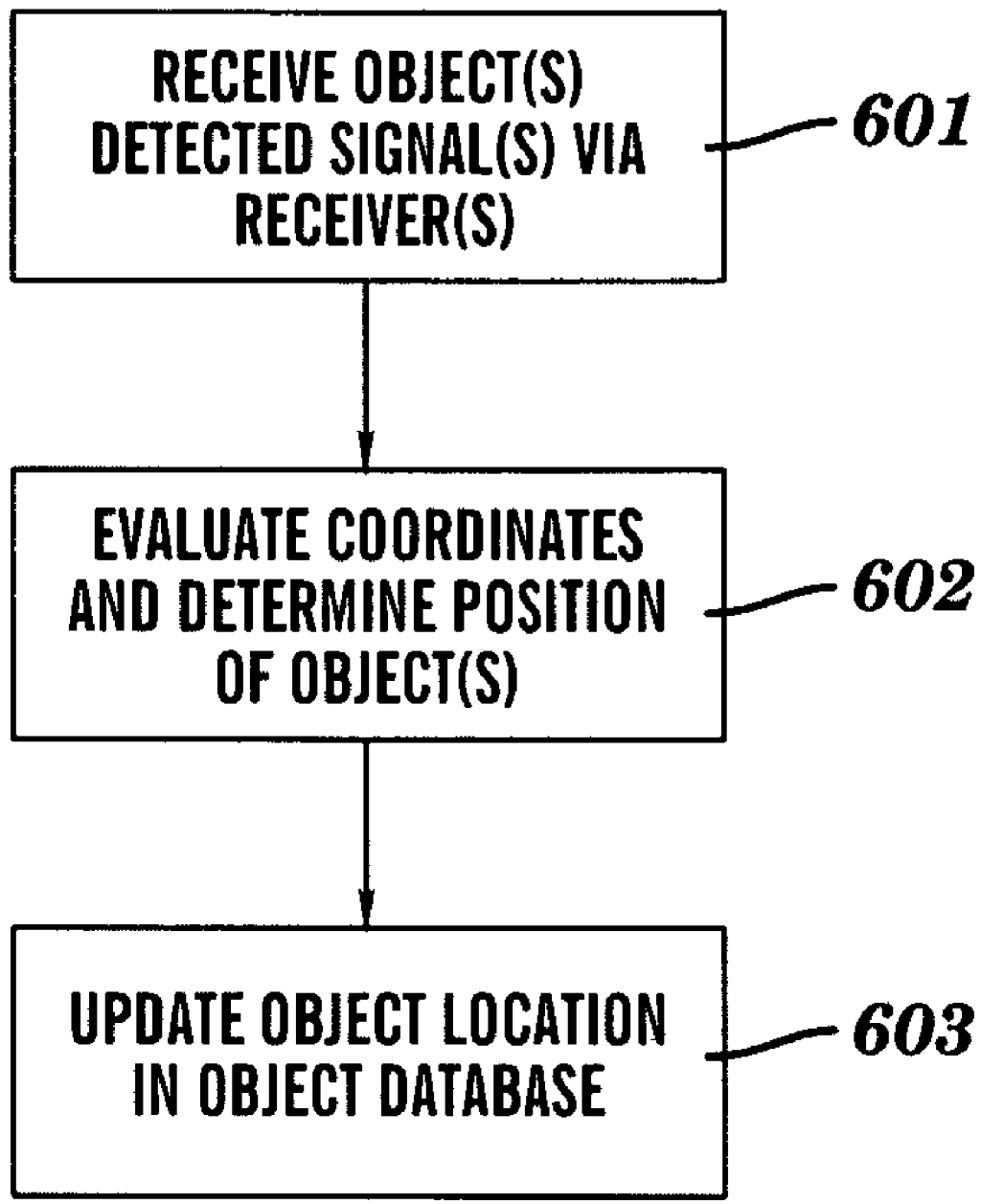
FIG. 5 illustrates a flowchart describing an algorithm used by the system of FIG. 1 for receiving location information, in accordance with embodiments of the present invention.

FIG. 5 illustrates a flowchart describing an algorithm used by system 2a of FIG. 1 for receiving location information, in accordance with embodiments of the present invention. In step 601 an evaluator computing system (e.g., evaluator computing system 301 of FIG. 1) receives location data for an object (i.e., via a sensory infrastructure transmitter). In step 602, the evaluator computing system extracts x, y, and z coordinates from the data and determines a location of the object. In step 603, the evaluator computing system stores the data in an object database.

Figure 6:
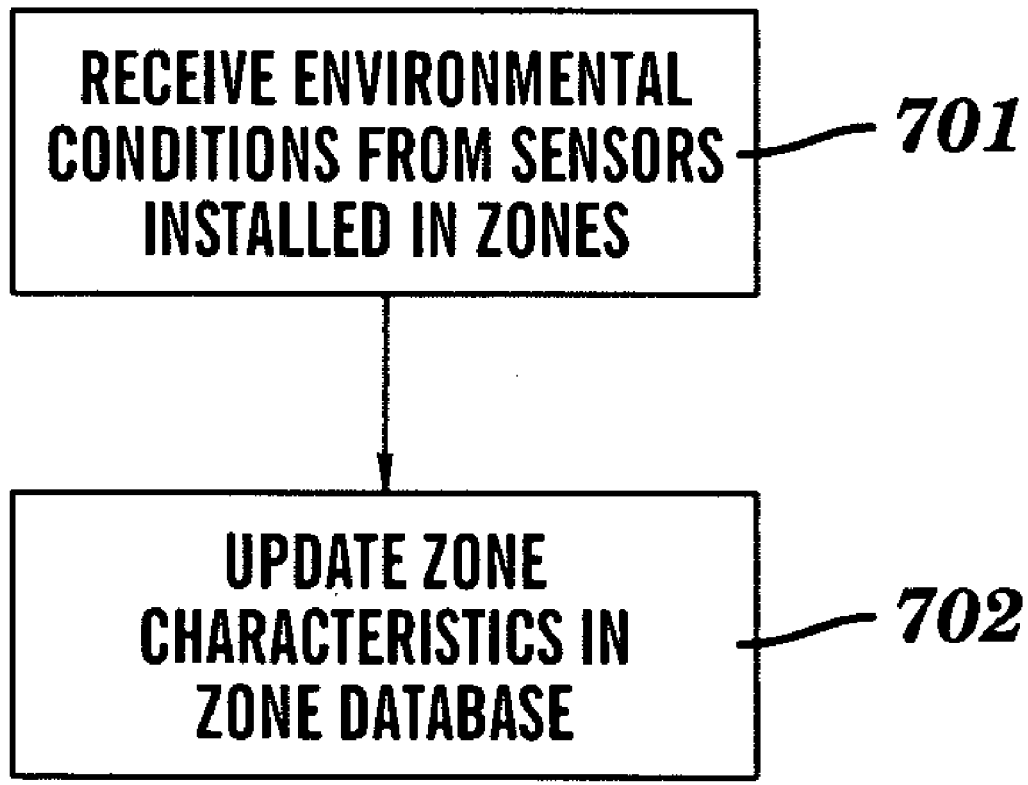
FIG. 6 illustrates a flowchart describing an algorithm used by the system of FIG. 1 for receiving environmental condition data, in accordance with embodiments of the present invention.

FIG. 6 illustrates a flowchart describing an algorithm used by system 2a of FIG. 1 for receiving environmental condition data, in accordance with embodiments of the present invention. In step 701, an evaluator computing system receives environmental condition data from sensors. In step 702, the received data is correlated with a zone and stored in a zone database (e.g., zone database 307 of FIG. 2) as zone characteristics.

Figure 7:
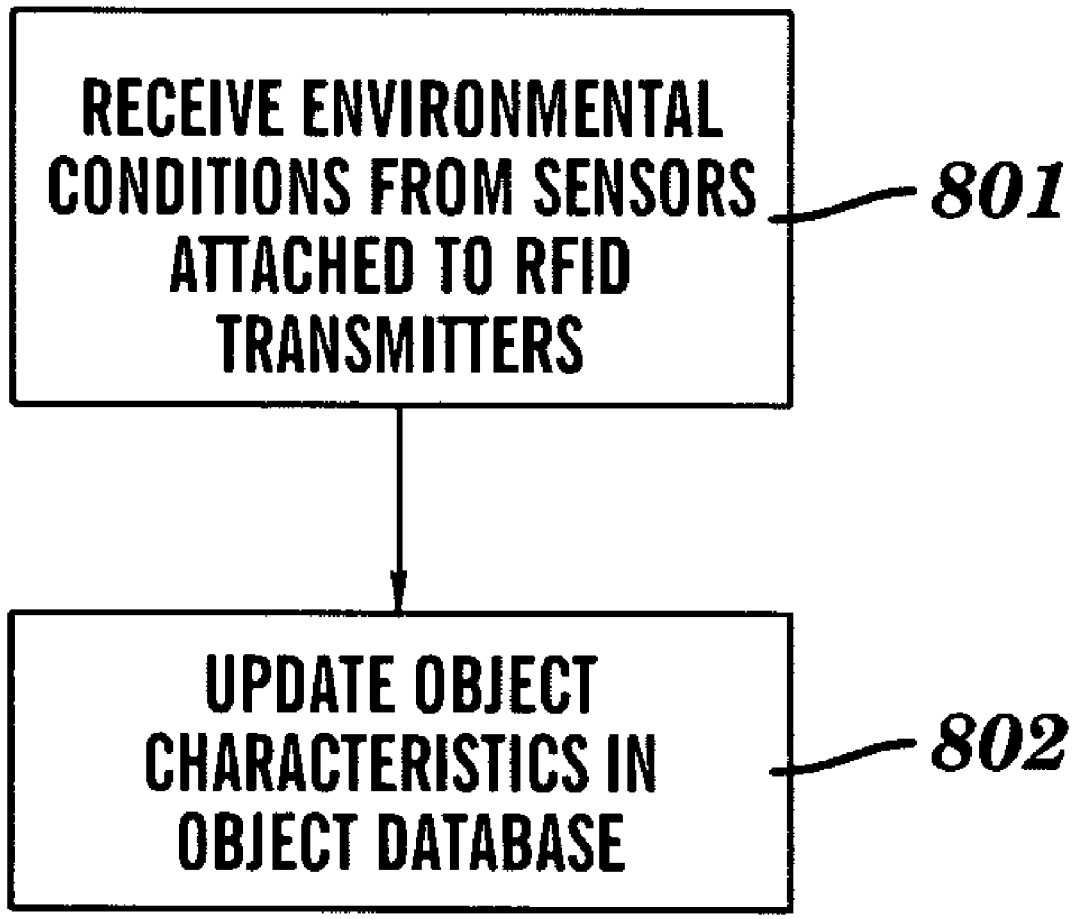
FIG. 7 illustrates a flowchart describing an algorithm used by the system of FIG. 1 for receiving environmental condition data from sensors attached to sensory infrastructure transmitters, in accordance with embodiments of the present invention.

FIG. 7 illustrates a flowchart describing an algorithm used by system 2a of FIG. 1 for receiving environmental condition data from sensors attached to sensory infrastructure transmitters, in accordance with embodiments of the present invention. In step 801, an evaluator computing system receives environmental condition data from sensors attached to sensory infrastructure Transmitters. In step 802, the data is stored in an object database (e.g., object database 308 of FIG. 2) as object characteristics.

Figure 8:
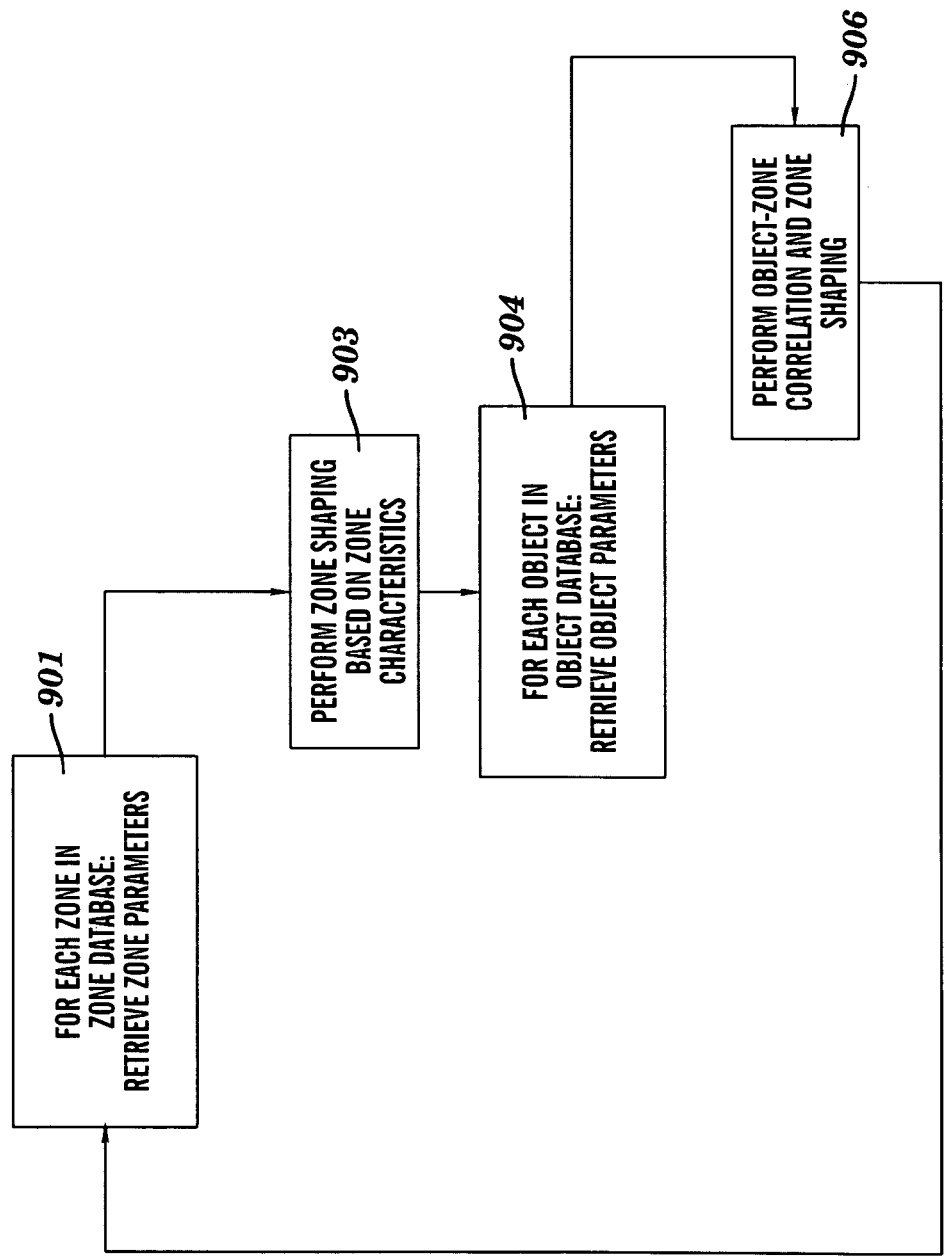
FIG. 8 illustrates a flowchart describing an algorithm used by the system of FIG. 1 for analyzing data stored in a zone database and an object database, in accordance with embodiments of the present invention.

FIG. 8 illustrates a flowchart describing an algorithm used by system 2a of FIG. 1 for analyzing data stored in a zone database and an object database, in accordance with embodiments of the present invention. In step 901 (i.e., for each zone stored in the zone database), zone parameters (e.g., a location and characteristics of the zone) are retrieved. In step 903, a zone shaping process is executed based on the zone characteristic retrieved in step 901. The zone shaping process is described in detail with respect to FIG. 10. In step 904, an evaluator computing system retrieves all object parameters (e.g., object locations and characteristics) stored in the object database. In step 906, the evaluator computing system performs an object zone correlation and zone shaping process as described in detail with respect to FIG. 9. The process described by the algorithm of FIG. 8 is repeated in order to make sure every object in the object database is correlated with each zone of the zone database and that all zones are correlated against every other zone.

Figure 9:
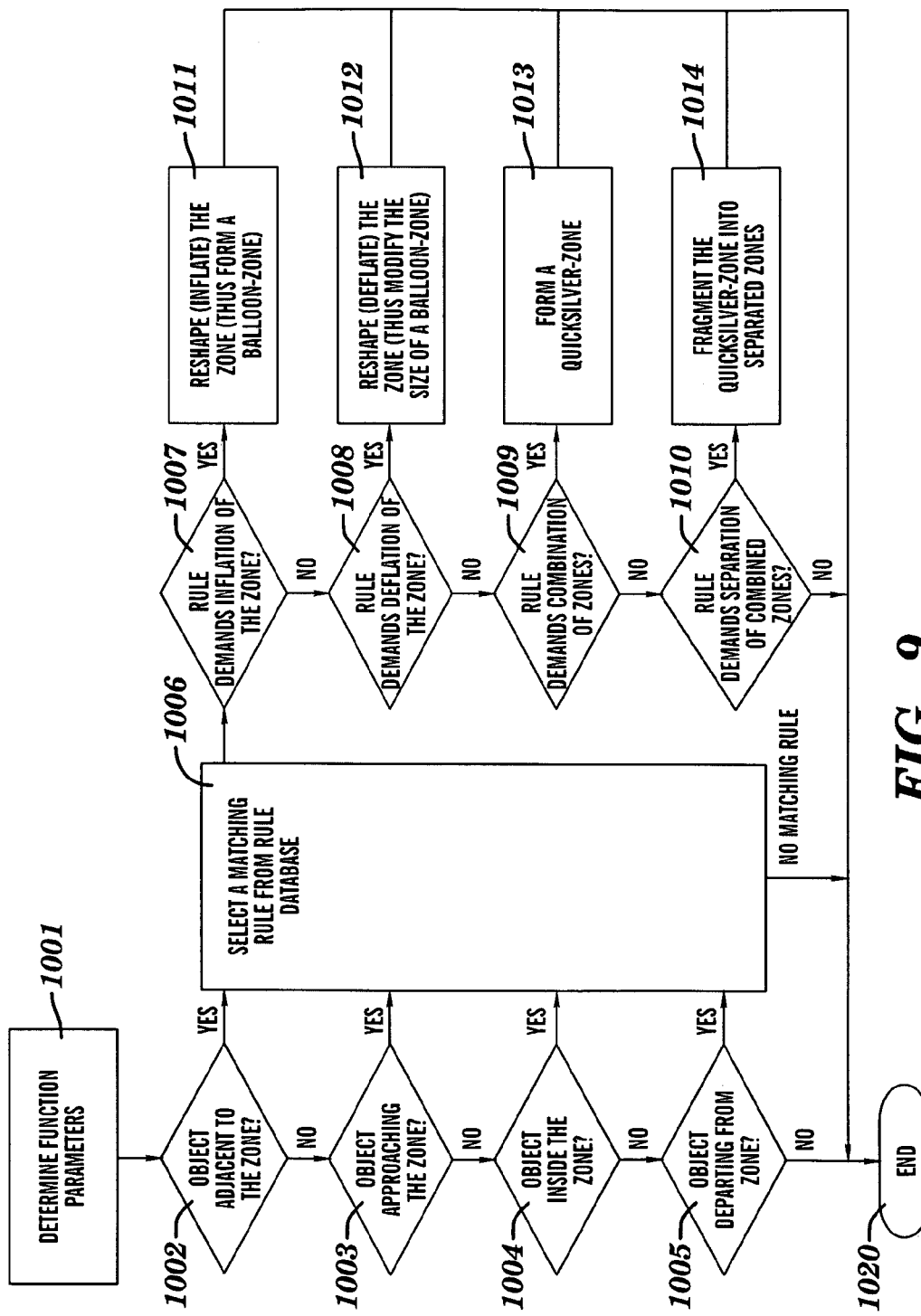
FIG. 9 illustrates a flowchart describing an algorithm detailing a first step of FIG. 8, in accordance with embodiments of the present invention.

FIG. 9 illustrates a flowchart describing an algorithm detailing step 906 of FIG. 8, in accordance with embodiments of the present invention. In step 1001, all relevant input parameters of the function are determined. For example, input parameters may comprise, inter alia:

1. Object coordinates.
2. Object movement.
3. Object characteristics.
4. Zone coordinates.
5. Zone characteristics.

In step 1002, it is determined if the object is adjacent to the zone. If in step 1002, it is determined that the object is adjacent to the zone then in step 1006 an associated rule is retrieved from the rules database. If in step 1002, it is determined that the object is not adjacent to the zone then in step 1003 it is determined if the object is approaching the zone. If in step 1003, it is determined that the object is approaching the zone then in step 1006 an associated rule is retrieved from the rules database. If in step 1003, it is determined that the object is not approaching the zone then in step 1004 it is determined if the object is inside the zone. If in step 1004, it is determined that the object is inside the zone then in step 1006 an associated rule is retrieved from the rules database. If in step 1004, it is determined that the object is not inside the zone then in step 1005 it is determined if the object is departing from the zone. If in step 1005, it is determined that the object is departing from the zone then in step 1006 an associated rule is retrieved from the rules database. If in step 1005, it is determined that the object is not departing from the zone then in step 1020 the process is terminated.

In step 1007, it is determined if the rule retrieved in step 1006 demands an inflation of the zone. If in step 1007, it is determined that the rule retrieved in step 1006 demands an inflation of the zone then in step 1011 the zone is inflated and the process is terminated in step 1020. If in step 1007, it is determined that the rule retrieved in step 1006 does not demand an inflation of the zone then in step 1008, it is determined if the rule retrieved in step 1006 demands a deflation of the zone. If in step 1008, it is determined that the rule retrieved in step 1006 demands a deflation of the zone then in step 1012 the zone is deflated and the process is terminated in step 1020. If in step 1008, it is determined that the rule retrieved in step 1006 does not demand a deflation of the zone then in step 1009, it is determined if the rule retrieved in step 1006 demands a combination of zones. If in step 1009, it is determined that the rule retrieved in step 1006 demands a combination of zones then in step 1013 a quicksilver zone is formed and the process is terminated in step 1020. If in step 1009, it is determined that the rule retrieved in step 1006 does not demand a combination of zones then in step 1010, it is determined if the rule retrieved in step 1006 demands a separation of combined zones. If in step 1010, it is determined that the rule retrieved in step 1006 demands separation of combined zones then in step 1014, the quicksilver zone is separated into multiple zones and the process is terminated in step 1020. If in step 1010, it is determined that the rule retrieved in step 1006 does not demand a separation of combined zones then in step 1020 the process is terminated.

Figure 10:
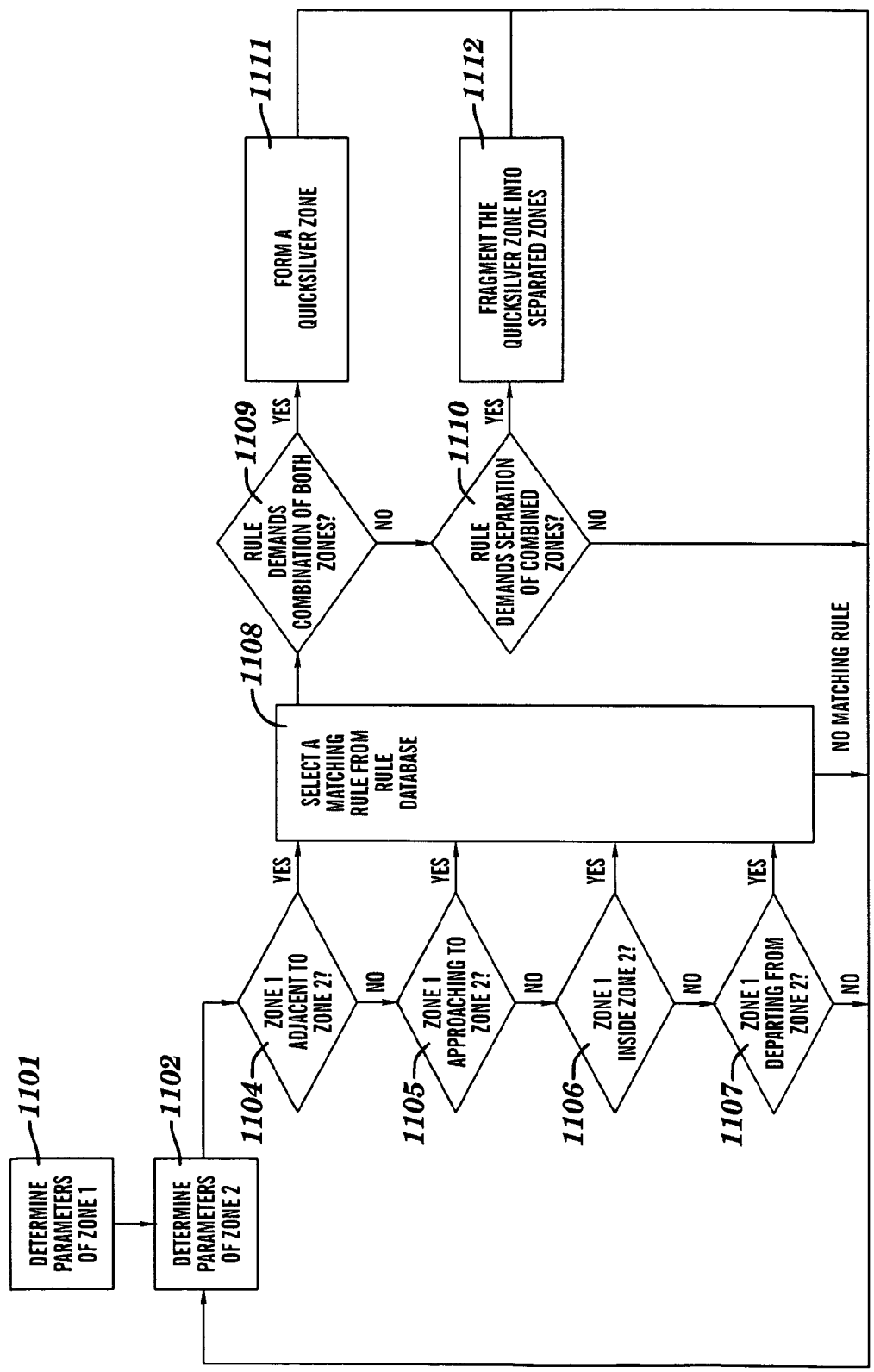
FIG. 10 illustrates a flowchart describing an algorithm detailing a second step of FIG. 8, in accordance with embodiments of the present invention.

FIG. 10 illustrates a flowchart describing an algorithm detailing step 903 of FIG. 8, in accordance with embodiments of the present invention. In step 1101, all relevant input parameters of a zone 1 are determined. The input parameters may comprise coordinates of the zone or characteristics of the zone. In step 1102, all relevant input parameters of a zone 2 are determined. The input parameters may comprise coordinates of the zone or characteristics of the zone. In step 1104, it is determined if zone 1 is adjacent to zone 2. If in step 1104, it is determined that zone 1 is adjacent to zone 2 then in step 1108, an associated rule is retrieved from the rules database. If in step 1104, it is determined that zone 1 is not adjacent to zone 2 then in step 1105 it is determined if zone 1 is approaching zone 2. If in step 1105, it is determined that zone 1 is approaching zone 2 then in step 1108 an associated rule is retrieved from the rules database. If in step 1105, it is determined that zone 1 is not approaching zone 2 then in step 1106 it is determined if zone 1 is inside zone 2. If in step 1105, it is determined that zone 1 is inside zone 2 then in step 1108 an associated rule is retrieved from the rules database. If in step 1106, it is determined that zone 1 is not inside zone 2 then in step 1107 it is determined if zone 1 is departing from zone 2. If in step 1108, it is determined that zone 1 is departing from zone 2 then in step 1108 an associated rule is retrieved from the rules database. If in step 1107, it is determined that zone 1 is not departing from zone 2 then step 1102 is repeated.

In step 1109, it is determined if the rule retrieved in step 1108 demands a combination of zones. If in step 1109, it is determined that the rule retrieved in step 1108 demands a combination of zones then in step 1111 a quicksilver zone is formed and step 1102 is repeated. If in step 1109, it is determined that the rule retrieved in step 1108 does not demand a combination of zones then in step 1110, it is determined if the rule retrieved in step 1108 demands a separation of combined zones. If in step 1110, it is determined that the rule retrieved in step 1108 demands separation of combined zones then in step 1112, the quicksilver zone is separated into multiple zones and step 1102 is repeated. If in step 1110, it is determined that the rule retrieved in step 1108 does not demand a separation of combined zones then step 1102 is repeated.

Figure 11:
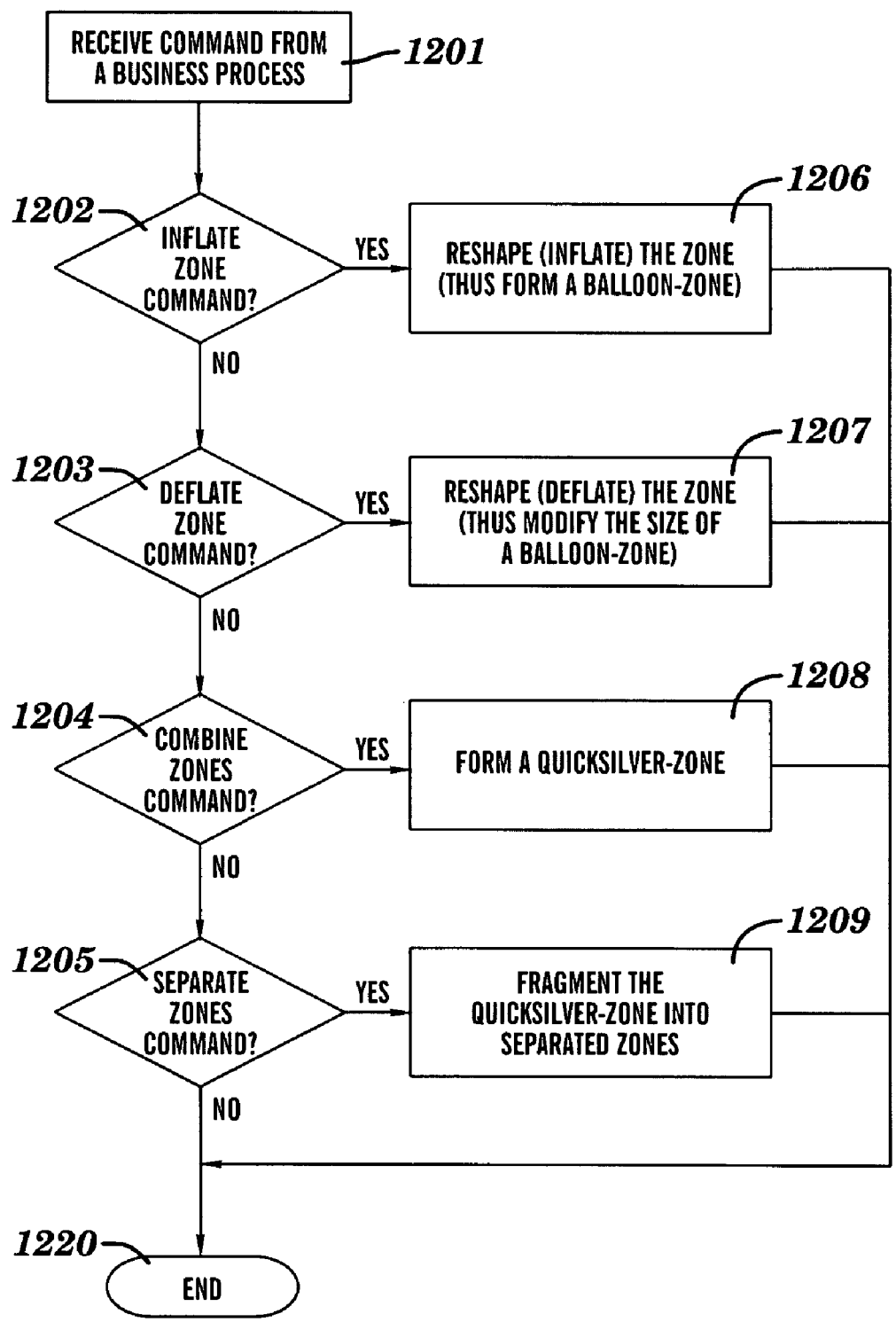
FIG. 11 illustrates a flowchart describing an algorithm used by the system of FIG. 1 for receiving a zone shaping command from any business process, in accordance with embodiments of the present invention.

FIG. 11 illustrates a flowchart describing an algorithm used by system 2*a* of FIG. 1 for receiving a zone shaping command from any business process, in accordance with embodiments of the present invention. In step 1201, a command is received by an evaluator computing system. In step 1202, it is determined if the command received comprises a command for inflating a zone. If in step 1202, it is determined that the command received in step 1201 comprises a command for inflating a zone then in step 1206 the zone is inflated and the process is terminated in step 1220. If in step 1202, it is that the command received in step 1201 does not comprise a command for inflating a zone then in step 1203, it is determined the command received in step 1201 comprises a command for deflating a zone. If in step 1203, it is determined that that the command received in step 1201 comprises a command for deflating a zone then in step 1207 the zone is deflated and the process is terminated in step 1220. If in step 1203, it is determined that the command received in step 1201 does not comprise a command for deflating of the zone then in step 1204, it is determined if the command received in step 1201 comprises a command for combining zones. If in step 1204, it is determined that the command received in step 1201 com-prises a command for combining zones then in step 1208 a quicksilver zone is formed and the process is terminated in step 1220. If in step 1204, it is determined that the command received in step 1201 does not comprises a command for combining zones then in step 1205, it is determined if the command received in step 1201 comprises a command for separating combined zones. If in step 1205, it is determined that the command received in step 1201 comprises a command for separating of combined zones then in step 1209, the quicksilver zone is separated into multiple zones and the process is terminated in step 1220. If in step 1205, it is determined that that the command received in step 1201 does not comprise a command for separating of combined zones then in step 1220 the process is terminated.

FIGS. 12*a*-12*d* illustrate a process for dynamically forming a quick silver zone 1308 from a fixed zone 1302 and a moving object zone 1304, in accordance with embodiments of the present invention.

Figure 12A:
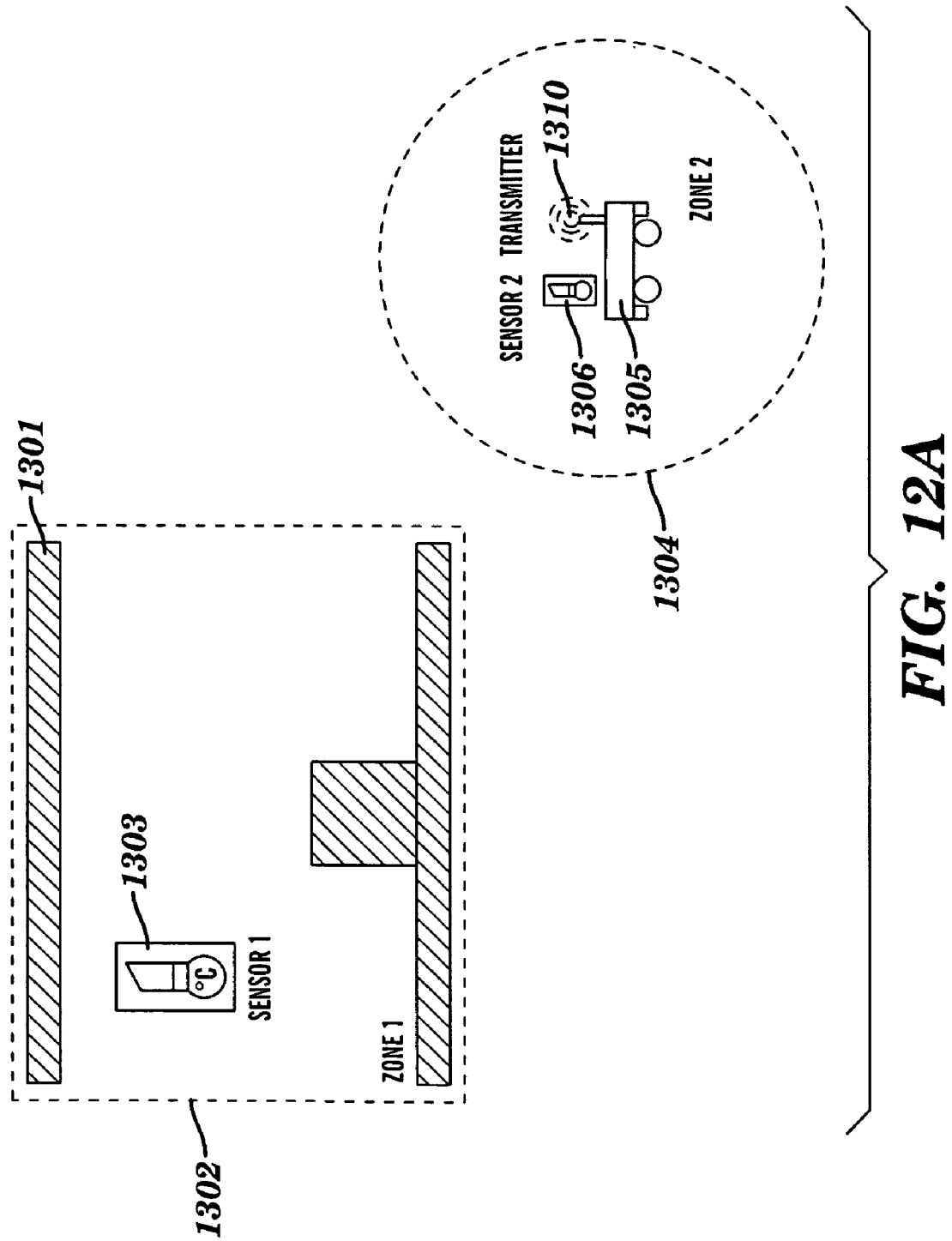
FIGS. 12a-12d illustrate a process for dynamically forming a quick silver zone from a fixed zone and a moving object zone, in accordance with embodiments of the present invention.

FIG. 12*a* illustrates fixed zone 1302 defined around a building 1301 comprising an environmental condition sensor 1303 installed. A moving zone 1304 is defined around an object 1305 comprising a sensory infrastructure Transmitter 1310 and an environmental condition sensor 1306.

Figure 12B:
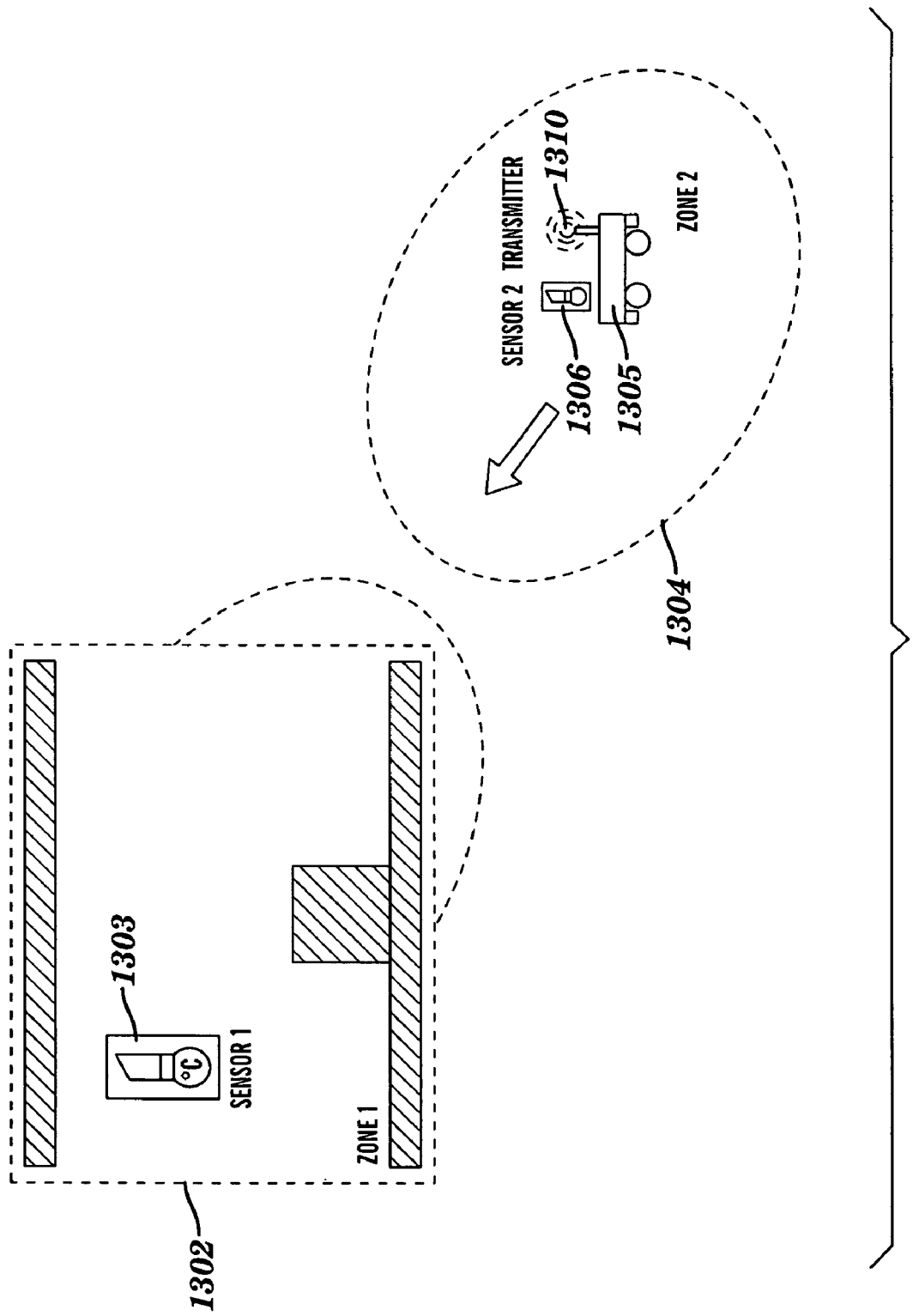

FIG. 12*b* illustrates zone 1304 approaching zone 1302. As zone 1304 approaches zone 1302, the shapes of both zones are changed such that a rule (i.e., as defined in a rule database) for both zones covers a larger area between them.

Figure 12C:
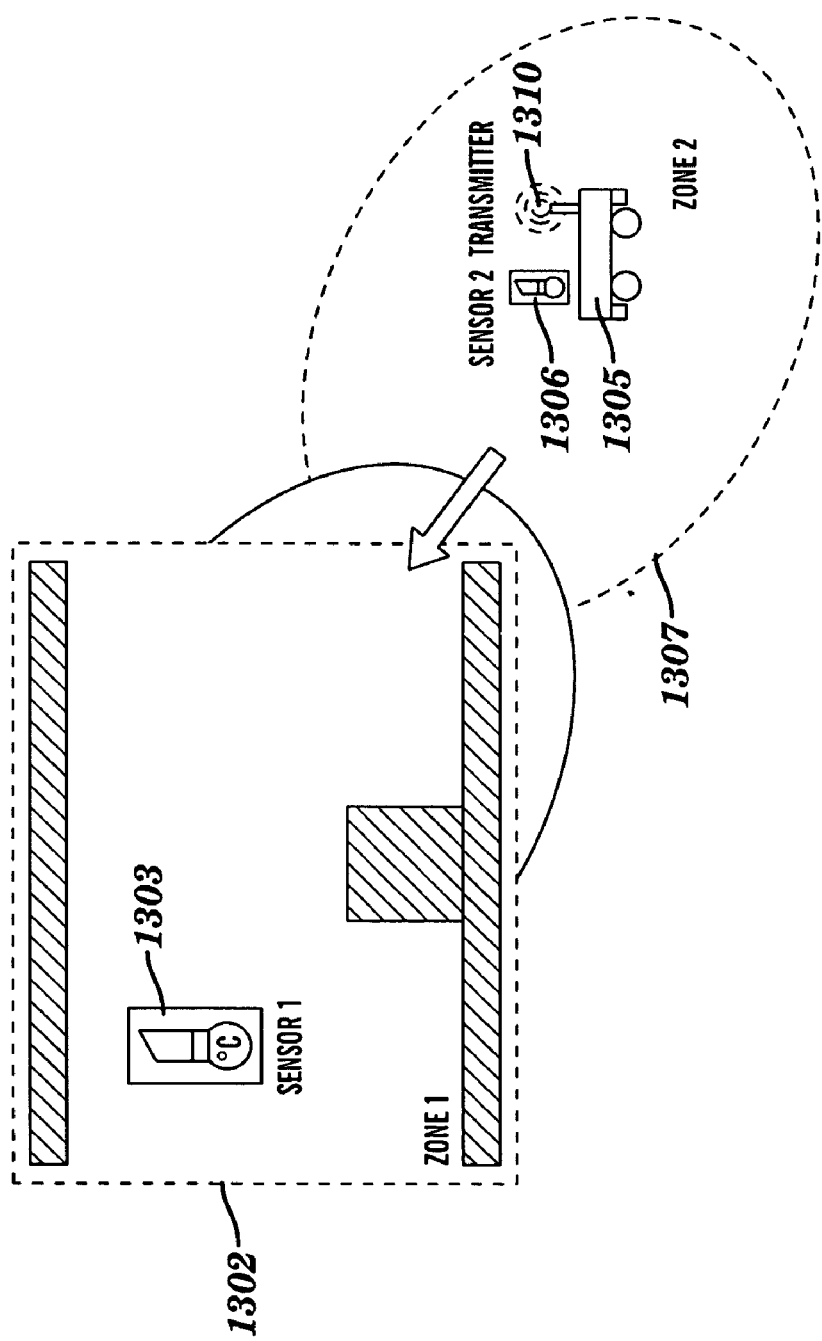

FIG. 12*c* illustrates a quicksilver zone 1307 formed from zone 1304 of FIG. 12*b* and zone 1302.

Figure 12D:
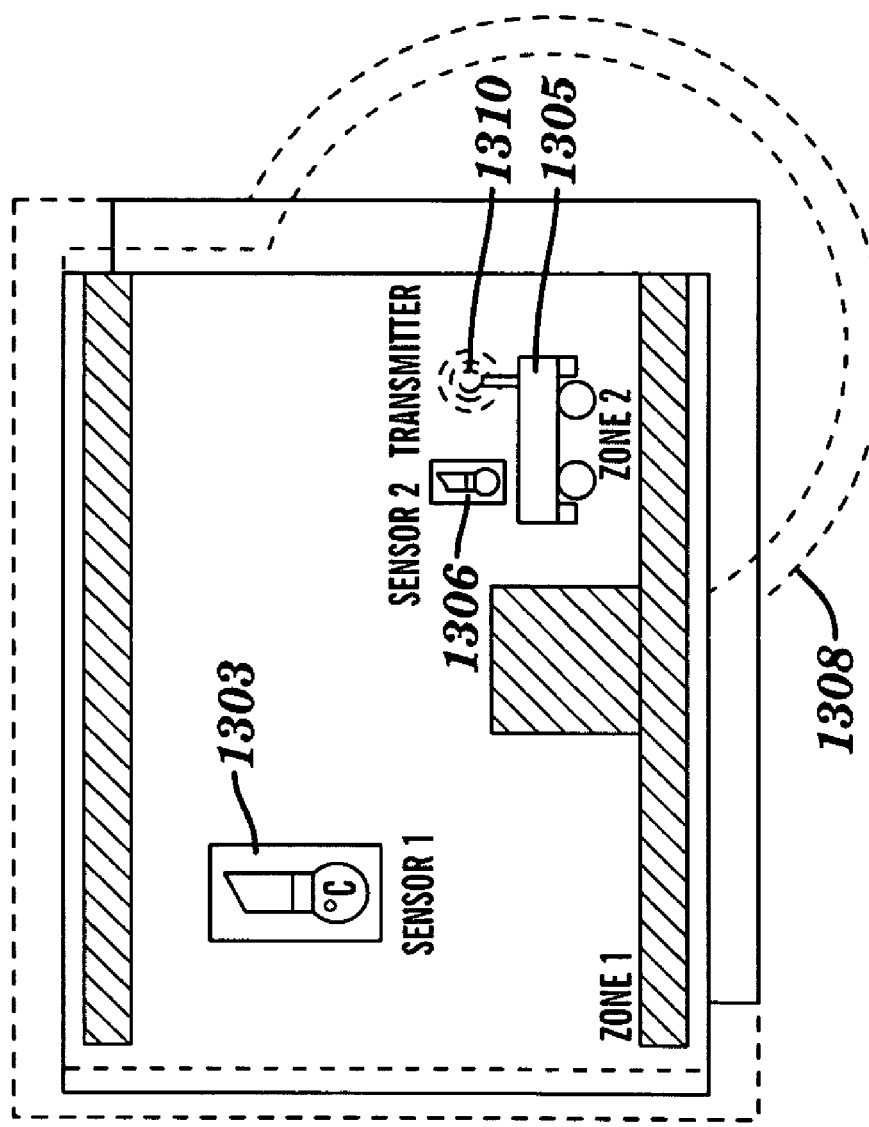

FIG. 12*d* illustrates a quicksilver zone 1308 formed from zone 1304 and 1302 of FIG. 12*b* as object 1305 enters zone 1302.

Figure 13:
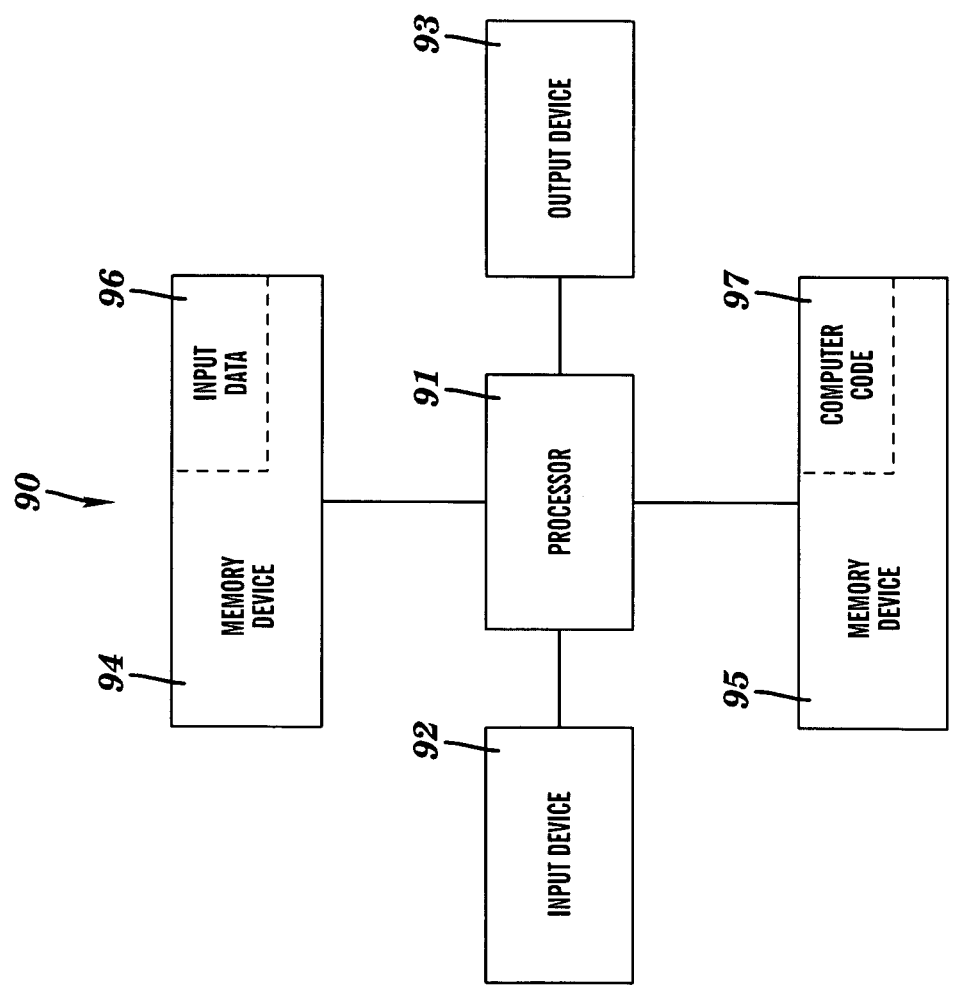
FIG. 13 illustrates a computer apparatus used for adjusting zone boundaries, in accordance with embodiments of the present invention.

FIG. 13 illustrates a computer apparatus 90 (e.g., evaluator computing system 301 of FIG. 1) used for adjusting zone boundaries, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a software application, a mouse, etc. The output device 93 may be, inter alia, a printer, a plotter, a computer screen, a magnetic tape, a removable hard disk, a floppy disk, a software application, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 5-11) for adjusting zone boundaries. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 13) may comprise the algorithms of FIGS. 5-11 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be created, integrated, hosted, maintained, deployed, managed, serviced, etc. by a service provider who offers to adjust zone boundaries. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for adjusting zone boundaries. In another embodiment, the invention provides a business method that performs the process steps of the invention on a subscription, advertising, and/or fee basis. That is, a service provider, such as a Solution Integrator, could offer to adjust zone boundaries. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 13 shows the computer system 90 as a particular configuration of hardware and software, any configuration of hardware and software, as would be known to a person of ordinary skill in the art, may be utilized for the purposes stated supra in conjunction with the particular computer system 90 of FIG. 13. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method comprising:
   receiving, by a computing system from a first sensory infrastructure transmitter attached to a first object, first data associated with said first object, wherein said first object is located within a first zone area, wherein said first data comprises location information associated with said first object and first attributes data describing characteristics associated with said first object, and wherein said first zone area comprises a first size;
   calculating, by said computing system based on said first data, a first location within said first zone area for said first object;
   storing, by said computing system, a first identifier for said first location;
   receiving, by said computing system from a first sensor, first environmental data associated with a first environmental condition in said first zone area, wherein said first sensor is located in said first zone area;
   storing, by said computing system, said first environmental data;
   first analyzing, by said computing system, said first data, said first identifier, and said first environmental data; and
   generating, by said computing system based on results of said first analyzing, a first modified zone area associated with said first zone area, wherein said first modified zone area comprises a second size, and wherein said second size differs from said first size.

2. The method of claim 1, further comprising:
   receiving, by said computing system from a second sensor, second environmental data associated with a second environmental condition in said first zone area, wherein said second sensor is attached to said first object;
   storing, by said computing system, said second environmental data; and
   second analyzing, by said computing system, said second environmental data, wherein said generating said first modified zone area is further based on results of said second analyzing.

3. The method of claim 2, wherein said first environmental condition differs from said second environmental condition.

4. The method of claim 2, further comprising:
   receiving, by said computing system from a third sensor, third environmental data associated with said first environmental condition external to said first zone area, wherein said third sensor is located external to said first zone area;
   storing, by said computing system, said third environmental data; and
   second analyzing, by said computing system, said third environmental data, wherein said generating said first modified zone area is further based on results of said second analyzing.

5. The method of claim 2, further comprising:
   receiving, by said computing system from a second sensory infrastructure transmitter attached to a second object, second data associated with said second object, wherein said second object is located within a second zone area, wherein said second data comprises location information associated with said second object and second attributes data describing characteristics associated with said second object, wherein said second zone area comprises a third size, wherein said third size differs from said second size, and wherein said second zone area is located at least partially external to said first zone area;
   calculating, by said computing system based on said second data, a second location within said second zone area for said second object;
   storing, by said computing system, a second identifier for said second location;
   receiving, by said computing system from a third sensor, third environmental data associated with a third environmental condition in said second zone area, wherein said third sensor is located in said second zone area;
   storing, by said computing system, said third environmental data;
   receiving, by said computing system from a fourth sensor, fourth environmental data associated with a fourth environmental condition in said second zone area, wherein said fourth sensor is attached to said second object;
   storing, by said computing system, said fourth environmental data; and
   second analyzing, by said computing system, said second data, said second identifier, said third environmental data, and said fourth environmental data, wherein said generating said first modified zone area is further based on results of said second analyzing, wherein said first modified zone area is associated with said second zone area, and wherein said generating said first modified zone area comprises combining said first zone area with said second zone area.

6. The method of claim 5, further comprising:
   receiving, by said computing system from a fifth sensor, fifth environmental data associated with a fifth environmental condition external to said first zone area and said second zone area, wherein said fifth sensor is located external to said first zone area and said second zone area;
   storing, by said computing system, said fifth environmental data; and third analyzing, by said computing system, said fifth environmental data, wherein said generating said first modified zone area is further based on results of said third analyzing.

7. The method of claim 2, further comprising:
comparing, by said computing system, said first environmental data to a first predetermined threshold.

8. The method of claim 7, further comprising:
determining, by said computing system based on said comparing said first environmental data to said first predetermined threshold, that said first environmental data exceeds said first predetermined threshold, wherein said generating said first modified zone area is further based on said first environmental data exceeding said first predetermined threshold.

9. The method of claim 7, further comprising:
determining, by said computing system based on said comparing said first environmental data to said first predetermined threshold, that said first environmental data does not exceed said first predetermined threshold;
comparing, by said computing system, said second environmental data to a second predetermined threshold;
determining, by said computing system based on said comparing said second environmental data to said second predetermined threshold, that said second environmental data exceeds said second predetermined threshold; and
generating, by said computing system based on said results of said first analyzing and said determining that said second environmental data exceeds said second predetermined threshold, a second modified zone area associated with said first modified zone area, wherein said second modified zone area comprises a third size, and wherein said third size differs from said first size and said second size.

10. The method of claim 1, wherein said generating said first modified zone area comprises increasing said first size.

11. The method of claim 1, wherein said generating said first modified zone area comprises decreasing said first size.

12. The method of claim 1, further comprising:
retrieving, by said computing system, zone shape data comprising a plurality of zone shape rules, wherein said generating said first modified zone area is further based on said zone shape data.

13. A computer program product, comprising a computer storage medium comprising a computer readable program code embodied therein, said computer readable program code configured to perform the method of claim 1 upon being executed by a processor of said computing system.

14. A computing system comprising a processor coupled to a computer-readable memory unit, said memory unit comprising instructions that when executed by the processor implements a zone shaping method, said method comprising:
receiving, by said computing system from a first sensory infrastructure transmitter attached to a first object, first data associated with said first object, wherein said first object is located within a first zone area, wherein said first data comprises location information associated with said first object and first attributes data describing characteristics associated with said first object, and wherein said first zone area comprises a first size;
calculating, by said computing system based on said first data, a first location within said first zone area for said first object;
storing, by said computing system, a first identifier for said first location;

receiving, by said computing system from a first sensor, first environmental data associated with a first environmental condition in said first zone area, wherein said first sensor is located in said first zone area;
storing, by said computing system, said first environmental data;
first analyzing, by said computing system, said first data, said first identifier, and said first environmental data; and
generating, by said computing system based on results of said first analyzing, a first modified zone area associated with said first zone area, wherein said first modified zone area comprises a second size, and wherein said second size differs from said first size.

15. The computing system of claim 14, wherein said method further comprises:
receiving, by said computing system from a second sensor, second environmental data associated with a second environmental condition in said first zone area, wherein said second sensor is attached to said first object;
storing, by said computing system, said second environmental data; and
second analyzing, by said computing system, said second environmental data, wherein said generating said first modified zone area is further based on results of said second analyzing.

16. The computing system of claim 15, wherein said method further comprises:
receiving, by said computing system from a third sensor, third environmental data associated with said first environmental condition external to said first zone area, wherein said third sensor is located external to said first zone area;
storing, by said computing system, said third environmental data; and
second analyzing, by said computing system, said third environmental data, wherein said generating said first modified zone area is further based on results of said second analyzing.

17. The computing system of claim 15, wherein said method further comprises:
receiving, by said computing system from a second sensory infrastructure transmitter attached to a second object, second data associated with said second object, wherein said second object is located within a second zone area, wherein said second data comprises location information associated with said second object and second attributes data describing characteristics associated with said second object, wherein said second zone area comprises a third size, wherein said third size differs from said second size, and wherein said second zone area is located at least partially external to said first zone area;
calculating, by said computing system based on said second data, a second location within said second zone area for said second object;
storing, by said computing system, a second identifier for said second location;
receiving, by said computing system from a third sensor, third environmental data associated with a third environmental condition in said second zone area, wherein said third sensor is located in said second zone area;
storing, by said computing system, said third environmental data;
receiving, by said computing system from a fourth sensor, fourth environmental data associated with a fourth environmental condition in said second zone area, wherein said fourth sensor is attached to said second object;

storing, by said computing system, said fourth environmental data; and second analyzing, by said computing system, said second data, said second identifier, said third environmental data, and said fourth environmental data, wherein said generating said first modified zone area is further based on results of said second analyzing, wherein said first modified zone area is associated with said second zone area, and wherein said generating said first modified zone area comprises combining said first zone area with said second zone area.

18. The computing system of claim 16, wherein said method further comprises:

receiving, by said computing system from a fifth sensor, fifth environmental data associated with a fifth environmental condition external to said first zone area and said second zone area, wherein said fifth sensor is located external to said first zone area and said second zone area;

storing, by said computing system, said fifth environmental data; and third analyzing, by said computing system, said fifth environmental data, wherein said generating said first modified zone area is further based on results of said third analyzing.

19. The computing system of claim 14, wherein said method further comprises:

comparing, by said computing system, said first environmental data to a first predetermined threshold.

20. The computing system of claim 19, wherein said method further comprises:

determining, by said computing system based on said comparing said first environmental data to said first predetermined threshold, that said first environmental data exceeds said first predetermined threshold, wherein said generating said first modified zone area is further based on said first environmental data exceeding said first predetermined threshold.

* * * * *